W. E. FERRIS.
MEANS FOR COUPLING TRAILERS TO MOTOR VEHICLES.
APPLICATION FILED APR. 30, 1919.
1,433,265. Patented Oct. 24, 1922.
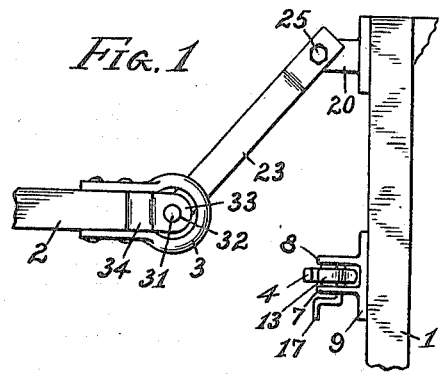
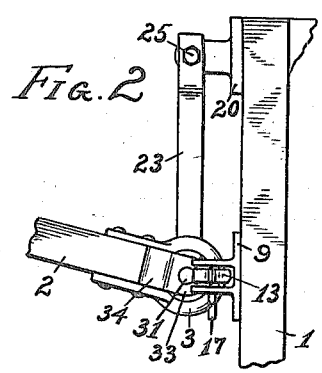
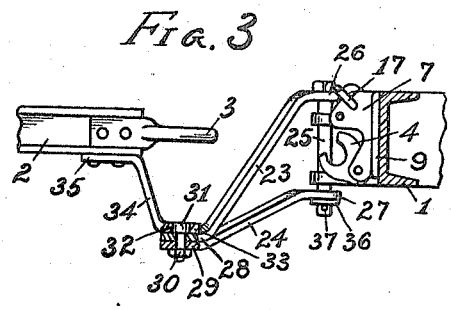
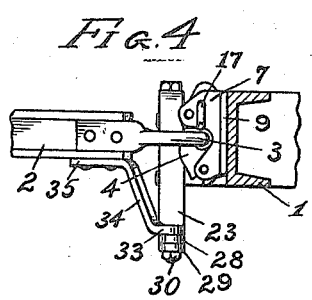
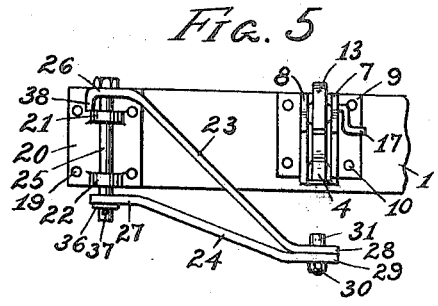
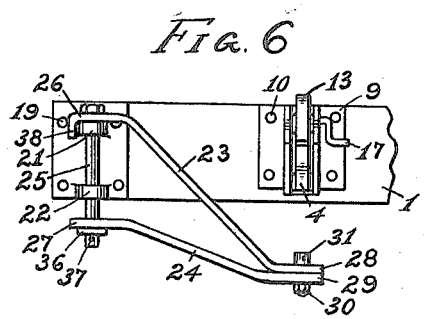
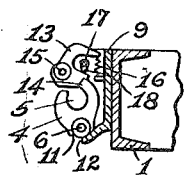
Inventor
W. E. Ferris Patented Oct. 24, 1922.

1,433,265

UNITED STATES PATENT OFFICE.

WILLIAM E. FERRIS, OF CLEVELAND, OHIO, ASSIGNOR TO THE OHIO TRAILER COMPANY, A CORPORATION OF OHIO.

MEANS FOR COUPLING TRAILERS TO MOTOR VEHICLES.

Application filed April 30, 1919. Serial No. 293,839.

*To all whom it may concern:*

Be it known that I, WILLIAM E. FERRIS, a citizen of the United States, residing at Cleveland, in the county of Cuyahoga and State of Ohio, have invented certain new and useful Improvements in Means for Coupling Trailers to Motor Vehicles, of which the following is a specification.

This invention relates to means for facilitating the coupling of a trailer to a motor vehicle, and has for its principal object to provide means whereby when a motor vehicle is backed in the vicinity of the coupling and of a trailer, the motor vehicle may be easily connected to the trailer and upon further backing of the motor vehicle, the trailer will be so guided that it will become coupled to the motor vehicle.

Another object of the invention is to provide said means of such a character that the same will become automatically disconnected from the trailer and at the same time locked against swinging movement upon the coupling of the motor vehicle to the trailer.

With the above and other objects in view as will be readily understood, the invention will be hereinafter fully described with reference to the accompanying drawings, and the novel features thereof will be particularly pointed out in the appended claims.

In the drawings, like characters of reference are used to designate corresponding parts.

Figure 1 is a plan view illustrating a motor vehicle after being backed in the vicinity of a trailer and connected thereto, Figure 2 is a similar view after the motor vehicle has been further backed and become coupled to the trailer, Figure 3 is a side view of Figure 1, Figure 4 is a side view of Figure 2, Figure 5 is a rear view of the motor vehicle as shown in Fig. 2, the guide link being in its up or connected position, Figure 6 is a similar view, the guide link being in its down or disconnected and locked position, and Figure 7 illustrates the automatic coupling.

Referring to the drawings, 1 represents the rear end of a motor vehicle, and 2 the forward portion of the draw-bar of a trailer to be coupled to the motor vehicle. To the end of said draw-bar is fixed an eye 3, which is adapted to be engaged by a suitable coupling at the rear end of the motor vehicle. The coupling shown is of the automatic type and consists of a hook 4 having an upper recess 5 for receiving said eye, which hook is pivoted at 6 between a pair of sides 7 and 8 of a bracket 9, fixed to the rear end of the motor vehicle by bolts 10. The hook 4 is prevented from swinging open beyond a certain position by means of its shoulder 11 engaging a stop 12 and it is locked in closed position by a latch 13 engaging its end 14. Said latch is arranged to swing between the sides of the bracket 9, and is pivoted thereto at 15. A spring 16 tends to retain the latch 13 in locking position, and a handle 17, carrying a cam 18 for throwing the latch out of locking position and also for holding it in locked position, is rotatably mounted in the sides of the bracket 9.

In coupling a trailer to a motor vehicle in the usual manner, one man operates the motor vehicle and another instructs him where to back so that the latter man may be able to connect the coupling parts. By means of the device now to be described, the operator is enabled to couple the trailer to the motor vehicle without assistance. To the rear end 1 of the motor vehicle and at the side of the center thereof, is fastened, by bolts 19, a bracket 20 having upper and lower horizontal lugs 21 and 22. A link arm formed of an upper bar 23 and a lower bar 24 is swingingly connected to said lugs by means of a vertical pivot pin 25, which passes through openings in the separated ends 26 and 27 of said bars. The free ends 28 and 29 of said bars are fixed together by means of a bolt 30, the head 31 of which is round and is adapted to engage an opening 32 in the lower end 33 of a depending bracket 34, which is fixed at its upper end 35 to the underside of the forward end 2 of the draw-bar. The distance between the separated ends 26 and 27 of the bars 23 and 24 is somewhat greater than that of the lugs 21 and 22 and the pivot pin 25 is sufficiently long to allow for vertical movement of the link arm. The pivot pin 25 is retained in place by means of a washer 36 and cotter pin 37. For holding the link arm in its upper position, so that the head 31 of the bolt 30 will engage the opening 32 of the bracket 34, the end 26 of its upper bar 23 is bent downwardly at 38 to serve as a foot for sliding upon the upper lug 21 during the backing of the motor vehicle. When the motor vehicle has been backed sufficiently to cause the eye 3 to be engaged by the hook 4, the link arm is substantially at a right angle to the lugs 21 and 22, the foot 38 has slid off the lug 21, and therefore the link arm is permitted to drop, which disengages the head 31 of the bolt 30 from the opening 32 of the bracket 33. As the foot 38 engages the side of the lug 21, the link arm is locked against swinging movement.

In order to couple the trailer to the motor vehicle, the motor vehicle is backed in such relation to the trailer as to enable the connecting of the link arm to the bracket 34, with the foot 38 resting upon the lug 21, and the coupling is set in its open position. After the connecting of the link arm, the backing of the motor vehicle, will cause the link arm to guide the eye 3 into the opening 5 of the hook 4, which will throw the hook upwardly until its end 14 is locked by the latch 13. At the same time, the foot 38 has slipped off the lug 21, thus permitting the link arm to drop and disengage itself from the bracket 34, and as the foot engages the side of said lug, the link arm is locked against swinging movement.

The invention set forth in the drawings and description is subject to slight changes so far as the details of construction and arrangement of the parts are concerned without departing from the scope of the claims.

Having fully described my invention, what I claim is:

1. In a means for facilitating the coupling of a trailer to a motor vehicle, the combination with cooperating coupling means carried by the trailer and the motor vehicle, and means adapted to connect the trailer to the motor vehicle for guiding the coupling means of the trailer into coupling relation with the coupling means of the motor vehicle when the motor vehicle is backed.

2. In a means for facilitating the coupling of a trailer to a motor vehicle, the combination with cooperating coupling means carried by the trailer and the motor vehicle, of a link arm adapted to connect the trailer to the motor vehicle for guiding the coupling means of the trailer into cooperating relation with the coupling means of the motor vehicle when the motor vehicle is backed, substantially as described.

3. In a means for facilitating the coupling of a trailer to a motor vehicle, the combination with cooperating coupling means carried by the trailer and the motor vehicle, of a link arm pivoted to the motor vehicle and adapted to be pivotally connected to the trailer for guiding the coupling means of the trailer into cooperating relation with the coupling means of the motor vehicle when the motor vehicle is backed, substantially as described.

4. In a means for facilitating the coupling of a trailer to a motor vehicle, the combination with cooperating coupling means carried by the trailer and the motor vehicle, of a link arm pivoted to the motor vehicle and adapted to be pivotally connected to the trailer for guiding the coupling means of the trailer into cooperating relation with the coupling means of the motor vehicle when the motor vehicle is backed, and means for automatically disconnecting the link arm from the trailer upon said coupling means having been brought into cooperating relation, substantially as described.

5. In a means for facilitating the coupling of a trailer to a motor vehicle, the combination with cooperating couplings means carried by the trailer and the motor vehicle, of a link arm pivoted to the motor vehicle and adapted to be pivotally connected to the trailer for guiding the coupling means of the trailer into cooperating relation with the coupling means of the motor vehicle when the motor vehicle is backed, and means for locking the link arm against swinging movement after it is disconnected from the trailer, substantially as described.

6. In a means for facilitating the coupling of a trailer to a motor vehicle, the combination of a coupling means carried by the motor vehicle and a cooperating coupling means carried by the trailer, a link arm pivoted to the motor vehicle at one side of the coupling means carried thereby, and the free end of the link arm being adapted to be pivotally connected to the trailer whereby the coupling means of the trailer will be guided to cooperate with the coupling means of the motor vehicle, substantially as described.

7. In a means for facilitating the coupling of a trailer to a motor vehicle, the combination of a coupling means carried by the motor vehicle and a cooperating coupling means carried by the trailer, a bracket fixed to the motor vehicle, a link arm pivoted to the bracket, the link arm being free to move vertically, a foot for holding the link arm in its upper position, the free end of the link arm being adapted to be pivotally connected to the trailer when in its upper position, and the foot permitting the link arm to drop for disconnecting it with the trailer after the coupling means of the trailer has been brought into cooperating relation with the coupling means of the motor vehicle, substantially as described.

8. In a means for facilitating the coupling of a trailer to a motor vehicle, the combination of a coupling means carried by the motor vehicle and a cooperating coupling means carried by the trailer, a bracket fixed to the motor vehicle, a link arm pivoted to the bracket, the link arm being free to move vertically, a foot carried by the link arm and adapted to slide upon the bracket for holding the link arm in its upper position, the free end of the link arm being adapted to be pivotally connected to the trailer when in its upper position and the foot being adapted to slide off said bracket for permitting the link arm to drop for disconnecting its free end with the trailer and to engage the bracket for locking the link arm against swinging movement when disconnected from the trailer, substantially as described.

In testimony whereof I affix my signature.

WILLIAM E. FERRIS.